June 5, 1923.
L. L. DOLLINGER
AIR FILTER
Filed Jan. 9, 1922
1,457,351
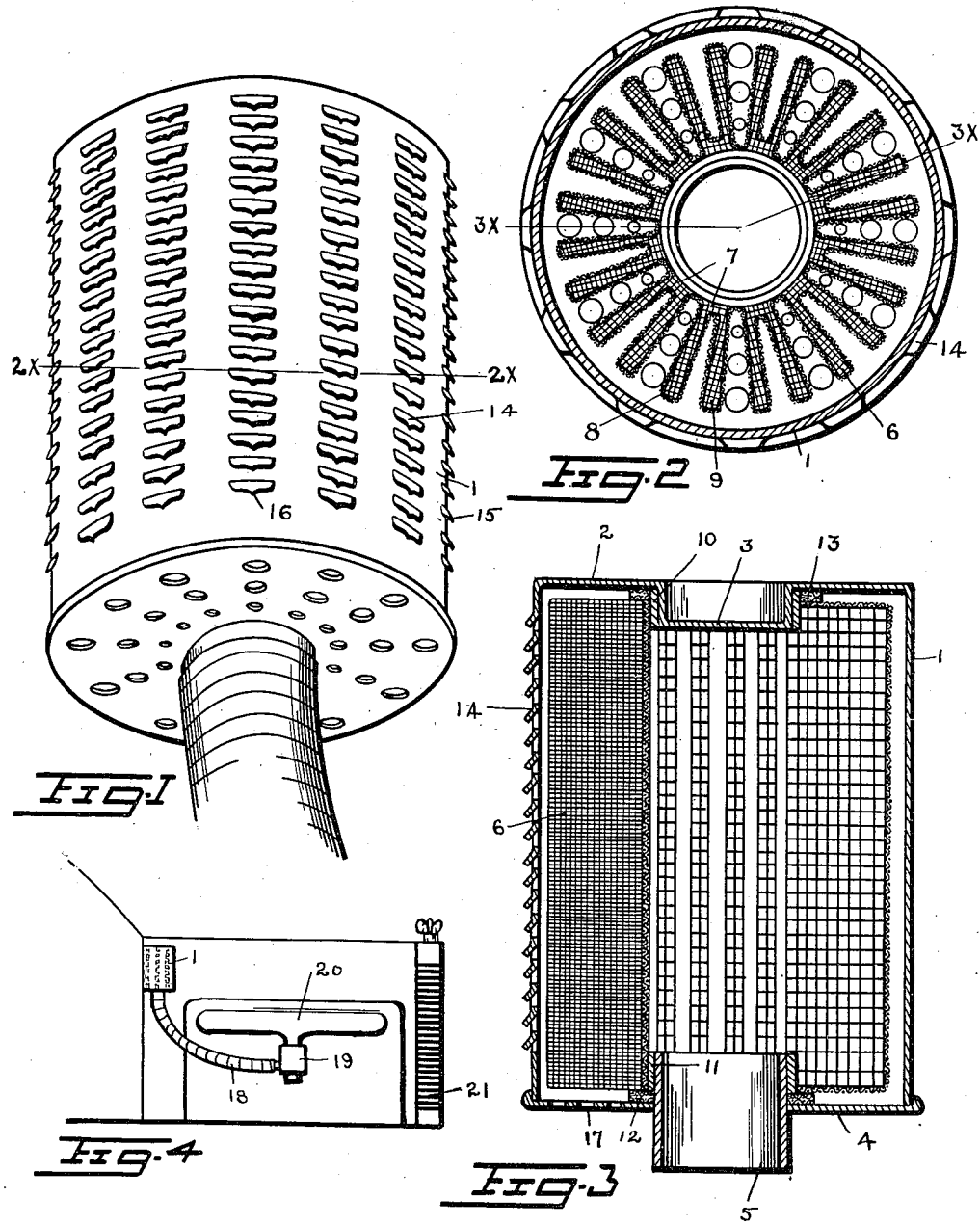
INVENTOR
LEWIS L. DOLLINGER
BY
Frank Keiper.
ATTORNEY Patented June 5, 1923.

1,457,351

UNITED STATES PATENT OFFICE.

LEWIS L. DOLLINGER, OF ROCHESTER, NEW YORK.

AIR FILTER.

Application filed January 9, 1922. Serial No. 528,086.

*To all whom it may concern:*

Be it known that I, LEWIS L. DOLLINGER, a citizen of the United States, residing at Rochester, in the county of Monroe and State of New York, have invented certain new and useful Improvements in Air Filters, of which the following is a specification.

The object of this invention is to provide a filter that will take all the solid matter out of the air and leave the air free from solid matter, abrasives, etc., so that the air will not carry such materials into the cylinders of an internal combustion engine or air compressor. It is also capable of a variety of other uses as well.

Another object of this invention is to make the filter of comparatively small volume but with a large filtering area of filtering surface.

Another object of this invention is to construct the filter in a manner that will permit the mounting of the filter in the open without danger of having water enter the filter should the rain fall on it.

These and other objects of this invention will be fully illustrated in the drawing, described in the specification and pointed out in the claims at the end thereof.

In the accompanying drawing:

Figure 1 is a perspective view of the filter ready to be connected to the air intake of a carburetor or other air intake.

Figure 2 is a horizontal section through the filter, the section being taken on the line $2^x$—$2^x$ of Figure 1.

Figure 3 is a vertical sectional view of the filter, the section being taken on the line $3^x$—$3^x$ of Figure 2.

Figure 4 is a diagrammatic view showing the placing of the filter on the car with reference to the air intake of the carburetor, the engine manifold and the radiator.

In the several figures of the drawing like reference numerals indicate like parts.

The air filter on which this is an improvement is illustrated and described in my prior Patent No. 1,359,879 issued November 23, 1920. It comprises the cylinder 1 which is closed at the top by the head 2 forming an integral part thereof. Centrally of this head is formed the cylindrical depression 3 for a purpose that will presently appear. At the lower end the cylinder is closed by the head 4 having a large central opening provided therein. A sleeve 5 is fitted into this opening and makes close joint with the head. The sleeve 5 extends into the inside of the cylinder and has a diameter equal to the diameter of the cylindrical depression 3 in the head 2. Both the cylindrical depression and the sleeve 5 thus form cylindrical flanges which project into the cylinder centrally thereof between which flanges the filtering screen 6 is held in place. The screen 6 is made up of a wire mesh which is folded to the outline shown in section in Figure 2. This figure shows that the screen is folded into a series of radial vertical pockets 7, each pocket being again divided into two smaller pockets 8 and 9 to increase the filtering area to a maximum with a resultant maximum efficiency in the filtering of air. The inner bends of the larger pockets are fastened to the sleeve 10 at one end and to the sleeve 11 at the other end. The sleeve 10 is adapted to telescope over the cylindrical depression 3 at the inside of the top of the cylinder and the sleeve 11 is adapted to telescope over the sleeve 5 extending into the inside of the bottom of the cylinder. In this way the serpentine strip of wire screen is firmly held in position between the upper and lower head concentric to the shell or cylinder 1.

The serpentine wire screen 6 is covered with a filtering cloth made up of a series of pockets which fit close to the outside wall of the screen and conform to the outline thereof. As viewed from the outside, the filter forms a series of outwardly opening pockets. The pockets project radially from the center and are wedge shaped.

At each end and surrounding the depression 3 and sleeve 5 are provided the heavy felt washers 12 and 13. These washers are interposed between the ends of the sleeves 10 and 11 and the heads 2 and 4 respectively, making a dust proof joint between them. These washers also center the screen 6 midway between the heads 2 and 4 so that the air can circulate between each head and the adjacent end of the filtering screen.

The cylinder or shell is perforated with a series of slots 14 arranged in vertical parallel rows equally distributed over the cylindrical surface of the shell 1. Each of the slots has a small tongue 15 projecting downwardly and out from above at an angle thereto. These tongues are struck up from the slots 14 in the shell and are formed with a point 16 in the middle thereof. The tongues 15 incline downwardly from above the slots and form an individual water shed for each of the slots. If it should rain on the filter the water will be deflected by the tongues 15 preventing it from entering the inside of the shell. The point 16 formed on each of the tongues operates to collect the water from the edge of the tongues and allows it to drop off at this point of the edge of the tongue in preference of any other part of the tongue. A uniform shedding of the water is thus secured.

In addition to the slots 14 in the side of the shell, the lower head 4 thereof is provided with the openings 17. These openings are distributed in radial rows with the openings on the outer edge of the head being larger than the openings near the center.

In practice, the sleeve 5 is coupled with a suction tube 18 that leads to the air intake of the carburetor 19, and the air is drawn from the inside of the filter through the cloth filtering material which is preferably of wool felt. As will be seen from an inspection of Figures 2 and 3 a large surface of the filtering cloth is exposed. This strains out any dust or solid matter that may be in the air at that time. The air in turn is drawn through the slots in the cylinder and the openings in the cylinder head 4. The openings in the cylinder head are opposite the outwardly opening pockets in the filter screen so that the air current is drawn centrally into the outwardly opening pockets and transversely through the filtering material.

The operation and function of the filter forming the subject matter of my present invention is the same as that of the filter shown and described in my prior patent above referred to except that the filtering area of the filtering screen is greatly increased without increasing any other part of the filter. The velocity of the air through the filtering material and in the outwardly opening pockets is only one-twentieth or one-twenty-fifth of what it is when it passes through the openings in the cylinder and there will, therefore, be an opportunity for the duct to precipitate on the lower head and pass through the openings in the lower head.

It will be understood that the carrying capacity of the air current varies approximately directly as the sixth power of the velocity of the current; that is, as regards the weight of the particles carried, and when the velocity is greatly reduced as it will be by the arrangement of my filter, the solid matter in the air will readily separate itself by gravity from the air and what still remains will be taken out by the filter.

After the air has passed through the filter, it is in the inwardly opening pockets, all of which communicate with the central opening of the filter so that the air quickly flows to the exhaust opening, practically free from dirt.

It will be noticed that the metal cylinder has no perforations opposite the ends of the inwardly opening pockets so that the inrush of air through the openings of the cylinder cannot directly strike the ends of the pockets but must go into the outwardly opening pockets and must go into these pockets centrally and then moves sidewise to the filtering surface at a low velocity, permitting the heavy solid matter to separate itself from the air while its velocity is being reduced or retarded in the pockets. The air does not strike directly on the filtering material but enters the shell at right angles to it and at so low a velocity that the dust rests lightly on the felt so that the accumulated dust itself is porous and readily permits the air to pass thru it and for the same reason is easily shaken off by the vibration of the machine whence it is discharged thru the openings in the bottom of the shell which makes the filter a self cleaning device, requiring practically no attention.

In Figure 4, I have shown the filter connected to the carburetor by a tube 18, the intake manifold being indicated by the numeral 20 and the position of the radiator being indicated by 21. The filter in this instance is located at the rear of the engine hood and at the top and out of the path of any air current or draft which will interfere with the precipitation of the dust. It is also located in a place where it receives the heat of the engine which keeps the filter warm and dry and furnishes warm air as well as clean air to the engine and in this way dispenses with the need of a stove which is usually used on the exhaust pipe of the engine.

I claim:

1. In an air filter, the combination of an outer cylinder having a series of openings therein, tongues overhanging each of the openings in said cylinder on the outside thereof, said tongues being struck up from the outer cylinder to form the openings therein and being inclined downwardly from the top of each of the openings, a filtering screen mounted within said cylinder and means whereby air is drawn from the outside of said outer cylinder through said filtering screen.

2. In an air filter, the combination of an outer cylinder, having openings therein, the openings in said cylinder being arranged in parallel rows, tongues overhanging each of the openings, said tongues having a point formed at the lower free edge thereof, said point being adapted to collect any water dropping onto said tongues and discharge this water at a predetermined point on the edge of each of the tongues.

3. In an air filter the combination of an outer cylinder having openings therein, tongues overhanging each of the openings, said tongues having a point formed at the edge thereof, said point being adapted to shed the water dripping on top of said tongues on either side of said point.

In testimony whereof I affix my signature.

LEWIS L. DOLLINGER.